United States Patent
Kulaga et al.

(10) Patent No.: US 11,477,232 B2
(45) Date of Patent: Oct. 18, 2022

(54) METHOD AND SYSTEM FOR ANTIVIRUS SCANNING OF BACKUP DATA AT A CENTRALIZED STORAGE

(71) Applicant: Acronis International GmbH, Schaffhausen (CH)

(72) Inventors: Andrey Kulaga, Moscow (RU); Vladimir Strogov, Moscow (RU); Sergey Ulasen, Moscow (RU); Oleg Ishanov, Moscow (RU); Igor Kornachev, Moscow (RU); Nikolay Grebennikov, Moscow (RU); Stanislav Protasov, Moscow (RU); Serguei Beloussov, Costa Del Sol (SG)

(73) Assignee: Acronis International GmbH, Schaffhausen (CH)

( * ) Notice: Subject to any disclaimer, the term of this patent is extended or adjusted under 35 U.S.C. 154(b) by 295 days.

(21) Appl. No.: 16/908,073

(22) Filed: Jun. 22, 2020

(65) Prior Publication Data
US 2021/0014243 A1    Jan. 14, 2021

Related U.S. Application Data

(60) Provisional application No. 62/871,251, filed on Jul. 8, 2019.

(51) Int. Cl.
*H04L 9/40*    (2022.01)
*G06F 11/14*   (2006.01)

(52) U.S. Cl.
CPC ........ *H04L 63/145* (2013.01); *G06F 11/1464* (2013.01); *H04L 63/1416* (2013.01); *H04L 63/1425* (2013.01); *G06F 2201/805* (2013.01)

(58) Field of Classification Search
CPC .............. H04L 63/145; H04L 63/1416; G06F 11/1464; G06F 2201/805
See application file for complete search history.

(56) References Cited

U.S. PATENT DOCUMENTS

| 8,627,025 B2 * | 1/2014 | Doshi | G06F 12/0871 |
| | | | 711/163 |
| 8,918,863 B1 * | 12/2014 | Pendse | H04L 63/1416 |
| | | | 726/22 |

(Continued)

*Primary Examiner* — Farid Homayounmehr
*Assistant Examiner* — Mudasiru K Olaegbe
(74) *Attorney, Agent, or Firm* — ArentFox Schiff LLP; Michael Fainberg (57) ABSTRACT

Disclosed herein are systems and method for anti-virus scanning of backup data at a centralized storage. In an exemplary aspect, a method may receive, at the centralized storage, a backup slice from each respective computing device in a plurality of computing devices, wherein the centralized storage comprises, for each respective computing device, a respective backup archive including a plurality of backup slices. The method may mount the received backup slice as a virtual disk. The method may detect, for the respective computing device, a change between the mounted virtual disk and any number of previous backup slices and may evaluate the change against behavioral rules to identify malicious behavior. In response to determining that the change exhibits malicious behavior, the method may execute a remediation action to prevent an attack on the plurality of computing devices or the centralized storage.

20 Claims, 5 Drawing Sheets

(56) References Cited

U.S. PATENT DOCUMENTS

| | | | |
|---|---|---|---|
| 10,194,321 B2* | 1/2019 | Guido | G06F 21/55 |
| 2002/0087588 A1* | 7/2002 | McBride | G06F 11/1464 |
| 2004/0158730 A1* | 8/2004 | Sarkar | G06F 21/564 |
| | | | 713/188 |
| 2005/0131900 A1* | 6/2005 | Palliyll | G06F 16/9014 |
| 2013/0339390 A1* | 12/2013 | Muller | G06F 16/24 |
| | | | 707/782 |
| 2016/0041884 A1* | 2/2016 | Iwasaki | G06F 11/1451 |
| | | | 707/646 |
| 2018/0121297 A1* | 5/2018 | Swallow | G06F 11/1464 |
| 2019/0340081 A1* | 11/2019 | Pradhan | G06F 9/5011 |

* cited by examiner

METHOD AND SYSTEM FOR ANTIVIRUS SCANNING OF BACKUP DATA AT A CENTRALIZED STORAGE

CROSS-REFERENCE TO RELATED APPLICATIONS

This application claims the benefit of U.S. Provisional Application No. 62/871,251, filed Jul. 8, 2019, which is herein incorporated by reference.

FIELD OF TECHNOLOGY

The present disclosure relates to the field of block storage of data, and, more specifically, to systems and methods for assessing vulnerabilities of backup data at a centralized storage.

BACKGROUND

In order to protect computing systems from virus attacks, anti-virus software is typically used to scan for threats. The database associated with the anti-virus software is updated periodically with features to detect the latest known threats. One approach to reduce the threat of an attack is to perform a regular anti-virus scan of backup data stored in archives as soon as the anti-virus database is updated. However, the regular anti-virus scan involves only a search for existing (i.e., known) malware. The goal of such scanning systems is not to systematically analyze data stored in archives so as to predict vulnerabilities and prevent future attacks. Anti-virus scanning that is based on searching for existing malware fails to provide insight for identifying features of malicious programs in advance (i.e., before an attack is launched) in order to prevent infection of user data. Moreover, such systems fail to provide early diagnosis of infected data.

Therefore, there is a need for an anti-virus scanning of data archived at a centralized storage location so as to reduce vulnerabilities of backup data to malicious software.

SUMMARY

Aspects of the disclosure relate to the field of centralized block storage of data. In particular, aspects of the disclosure describe methods and systems for anti-virus scanning of backup data at a centralized storage.

In an exemplary aspect, a method may receive, at the centralized storage, a backup slice from each respective computing device in a plurality of computing devices, wherein the centralized storage comprises, for each respective computing device, a respective backup archive including a plurality of backup slices. The method may determine when the received backup slice is created for backing up the respective computing device, wherein backup slices are received in accordance to an execution cycle that is periodic. In response to determining that the received backup slice is created during a current execution cycle, the method may mount the received backup slice as a virtual disk. The method may detect, for the respective computing device, a change between the mounted virtual disk and any number of previous backup slices, in the respective backup archive, created during previous execution cycles. The method may determine whether the change has occurred in at least a threshold amount of remaining computing devices in the plurality of computing devices backing up to the centralized storage. In response to determining that the change has not occurred in at least the threshold amount of the remaining computing devices, the method may evaluate the change against behavioral rules to identify malicious behavior. In response to determining that the change exhibits malicious behavior, the method may execute a remediation action to prevent an attack on the plurality of computing devices or the centralized storage.

In some aspect, the plurality of computing devices are all connected to a network of an organization.

In some aspects, in response to determining that the change has occurred in at least the threshold amount of the remaining computing devices, the method may determine whether the change has been authorized by the organization, and in response to determining that the change has been authorized by the organization, may add to the behavior rules a rule that whitelists the change.

In some aspects, in response to determining that the changed not been authorized by the organization, the method may determine that the change exhibits malicious behavior.

In some aspects, the method may determine, for each respective computing device, a respective likelihood of the respective computing device to be targeted by a malicious attack. The method may identify, as part of a subset of computing devices, each respective computing device with a respective likelihood greater than a threshold likelihood.

In some aspects, the method may determine whether the change is detected in more than a threshold amount of the subset of computing devices. In response to determining that the change is detected in more than the threshold amount of the subset, the method may determine that the change exhibits malicious behavior.

In some aspects, the centralized storage comprises an additional plurality of backup archives of an additional plurality of computing devices that are connected to a different network of a different organization.

In some aspects, subsequent to determining that the change exhibits malicious behavior, the method may execute the remediation action to prevent the attack on the additional plurality of computing devices.

In some aspects, the method may evaluate the change against the behavioral rules to identify malicious behavior by identifying an object in the received backup slice that was changed, determining whether the change is in a whitelist of approved changes to the object, and in response to determining that the change is not in the whitelist, determining that the change exhibits malicious behavior.

In some aspects, the method may evaluate the change against the behavioral rules to identify malicious behavior by identifying an object in the received backup slice that was changed, determining whether the change is in a blacklist of changes prohibited for the object, and in response to determining that the change is in the blacklist, determining that the change exhibits malicious behavior.

In some aspects, the behavioral rules are based on a heuristic model that is applied by establishing respective weights on a decision-making scale based on types and quantities of changes, establishing thresholds for taking remediation actions, and taking at least one remediation action when a threshold is reached or exceeded.

In some aspects, detecting the change comprises detecting at least one of: a new file in a directory, a new directory, a change in size of an existing file, a change in location of the existing file, deletion of the existing file, and a change in metadata of the existing file.

It should be noted that the methods described above may be implemented in a system comprising a hardware processor. Alternatively, the methods may be implemented using computer executable instructions of a non-transitory computer readable medium.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for anti-virus scanning of backup data at a centralized storage. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

As an introduction, a number of definitions and concepts that are used in describing aspects of the disclosure are provided below.

An anti-virus scanner refers to a software which scans data, e.g., user data, to detect malware (i.e., malicious software).

A machine learning module refers to a software module that is designed to: collect and process large amount of data; and develop rules that can be used to detect malware.

A centralized backup storage refers to a centralized data storage location intended to store backups created according to rules and policies of a user (e.g., an individual, a company, etc.) in regards to backing up data. The centralized backup storage may be physically located on servers internal to the network of the user. For example, the centralized backup storage may be within the internal network or a company. It is noted that, in turn, the centralized backup storage may be backed up using a cloud based storage, e.g., a distributed storage external to the network of the user.

A backup archive refers to a set of backup slices which belong to one certain computing device (e.g., one server, one workstation, etc.).

A backup slice refers to a set of files created during one cycle of execution of a task for backing up a computing device. Thus, a backup slice represents a point-in-time to which the system of the computing device can be restored. Typically, the first backup slice is a result of a full data backup of the computing device and each backup slice subsequent to the first backup slice is a result of an incremental backup of the computing device. The incremental backup is typically for one cycle of execution of the task of backing up the computing device.

An archive analyzer refers to a software program (or a module) that performs an analysis of backup slices stored in backup archives to detect and compare changes that have occurred between successively created backup slices.

An archive mounter refers to a program which creates a virtual disk from a backup slice and allows a user to work with the backup slice the same as a physical disk. The work includes the ability to save changes to the data in the backup slice, if such changes were made.

Figure 1:
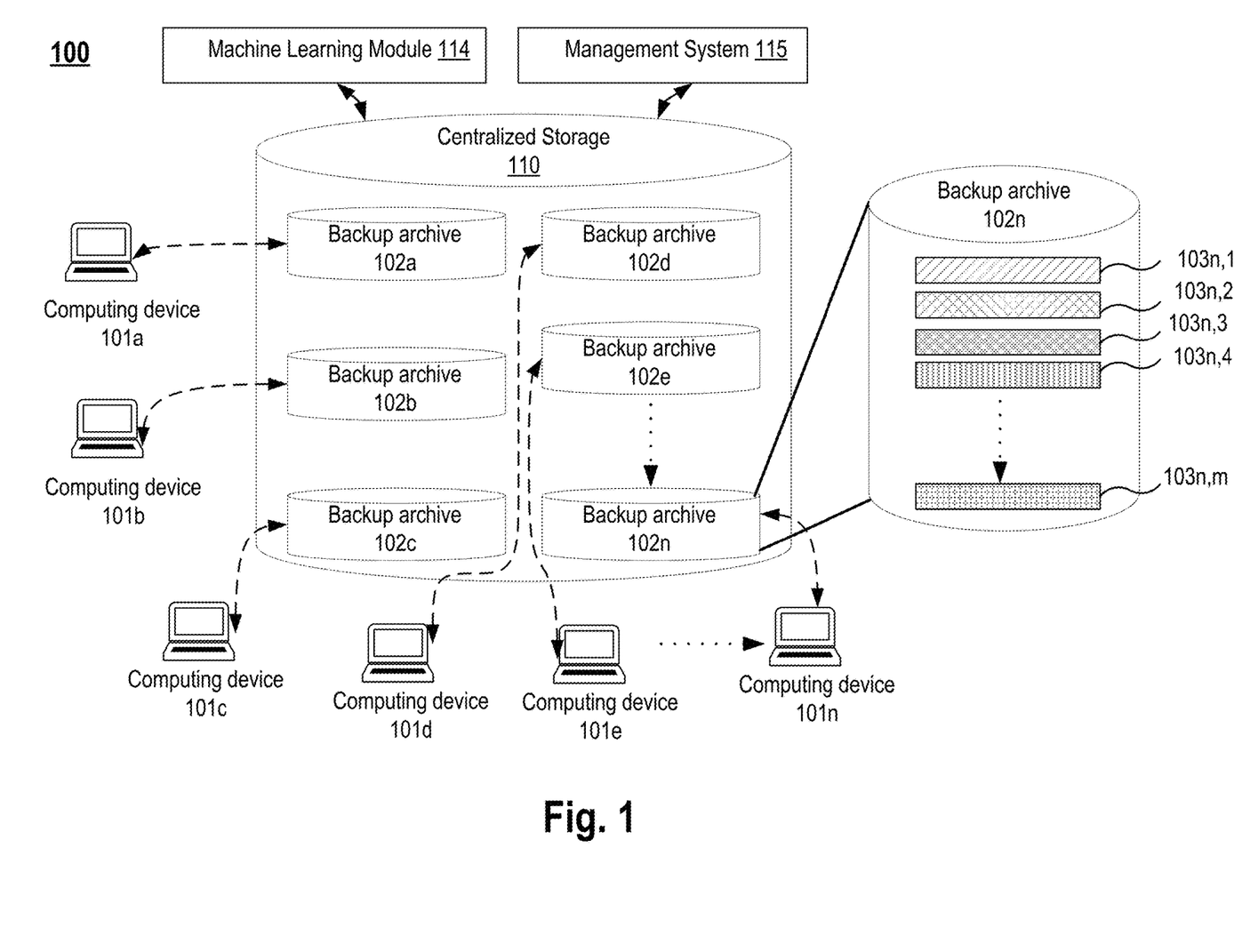
FIG. 1 is a block diagram illustrating a system for anti-virus scanning of backup data at a centralized storage.

FIG. 1 is a block diagram illustrating a system 100 for anti-virus scanning of backup data at a centralized storage. The teachings of the present disclosure are described below for the scenario in which a centralized storage is used for backing up computing devices. However, without any loss of generality, the anti-virus scanning of the present disclosure may be implemented in conjunction with any type of data storage known in the art, e.g., distributed cloud storage.

The system 100 includes a centralized storage 110, a plurality computing devices $101_a$, $101_b$, ..., $101_n$ for which the centralized storage 110 is used to store backup data, a management system 115, and machine learning module 114.

The centralized storage 110 may be monitored and managed by the management system 115. Data is collected and analyzed by the machine learning module 114 to develop and/or improve rules for detecting malware.

The centralized storage 110 may include any number of servers located at the centralized backup location. A server of the centralized storage 110 may comprise any number of physical components, e.g., processors, physical block storage devices (e.g., Hard Disk Drives (HDDs), Solid State Drives (SSDs), flash drives, SMR disks, etc.) or memory (e.g., Random Access Memory (RAM)), I/O interface components, etc. However, only block storage devices are described in relation to the present disclosure.

In one aspect, the centralized storage 110 includes backup archives $102_a$, $102_b$, ..., $102_n$ for storing backup data of respective computing devices $101_a$, $101_b$, ..., $101_n$. For example, backup data for computing device $101_a$ may be stored in backup archive $102_a$, backup data for computing device $101_b$ may be stored in backup archive $102_b$, and so on. The storage disks of the computing devices $101_a$, $101_b$, ..., $101_n$ are periodically backed up to the centralized storage 110.

Each of the backup archives $102_a$, $102_b$, ..., $102_n$ includes a plurality of backup slices, with each backup slice being created during a single execution cycle of a task for backing up the respective computing device for which the backup archive is used. The number of backup slices is equal to the number of times the backup task is executed. As such, a particular backup slice represents a point-in-time to which the system of the computing device may be restored. For instance, the backup archive $102_n$ includes backup slices $103_{n,1}, 103_{n,2}, \ldots, 103_{n,m}$, with m representing the number of backup slices for backup archive of the computing device $101_n$.

In some aspects, a plurality of computing devices are all connected to a network of an organization. For example, computing devices 101a, 101b, and 101c may be part of organization such as a company or university. These computing devices may be connected to one another over a local area network (LAN) or wide area network (WAN). Because of this connection, there is a risk that a malicious infection on one of the computing devices can spread to the other computing devices. Likewise, the centralized storage may comprises an additional plurality of backup archives of an additional plurality of computing devices that are connected to a different network of a different organization. For example, the different organization may be a different company or institution and the additional plurality of computing devices may comprise computing devices 101d, 101e, and 101n. It is possible that the plurality of computing devices have never interacted with the additional plurality of computing devices. In some aspects, management system 115 may identify whether a computing device is part of an organization based on the data packets received from the computing device. For example, each computing device may identify the organization it is affiliated with in the payload of a data packet. Once the management system 115 affiliates the computing device with an organization (e.g., by making a record of the identification information regarding the computing device in a data structure stored in the centralized storage), management system 115 may determine that the computing device is part of the organization in future communications by referring to the source IP address listed in the headers of data packets.

Figure 2:
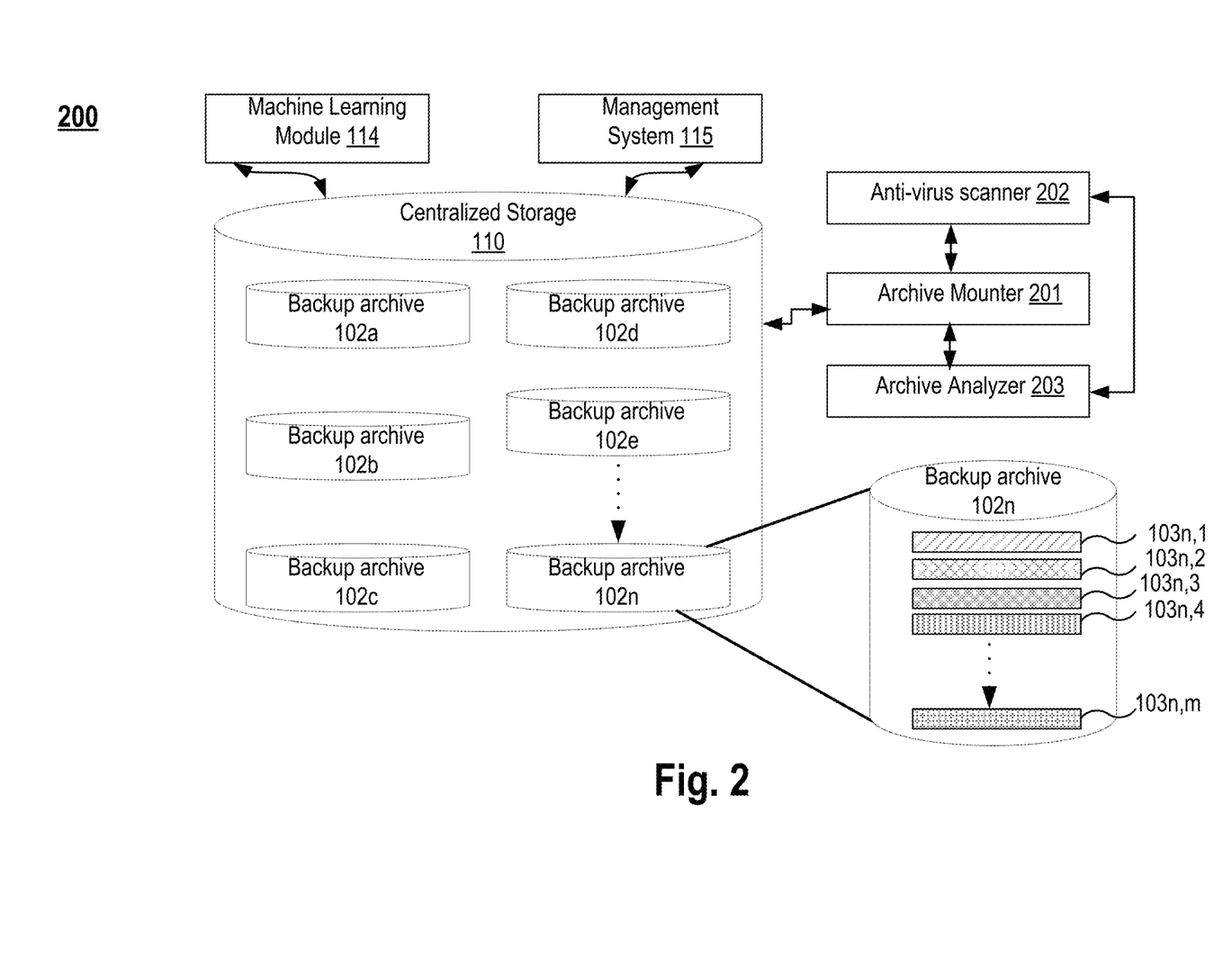
FIG. 2 is a block diagram illustrating anti-virus scanning of backup slices.

FIG. 2 is a block diagram 200 illustrating anti-virus scanning of backup slices. The anti-virus scanning of backup slices may be performed in a pre-determined schedule. For example, the management system 115 may specify the pre-determined schedule. It is noted that a same predetermined schedule may be used for all backup archives in the centralized storage 110. However, in some scenarios, different predetermined schedules may be more appropriate. For instance, some computing devices may be more vulnerable due to the profile of users accessing the computing devices, sensitivity of content stored on the computing devices, physical locations of the computing device, etc. Thus, without loss of generality, the predetermined schedule may be selected (or configured) based on implementation and/or need.

An archive mounter 201 may be used to mount any of the backup slices $103_{n,1}, 103_{n,2}, \ldots, 103_{n,m}$ as virtual disks. Then, an anti-virus scanner 202 scans the mounted virtual disk, detects changes (if any) between two or more backup slices, and provides the detected changes to an archive analyzer 203. Then, the archive analyzer 203 analyzes the detected changes to classify the detected changes and identify changes that exhibit malicious behavior. In one aspect, the analysis of the detected changes may be based on: a statistical model, a heuristic model, a behavioral model, or any other model.

In one aspect, when the analysis of the detected changes is based on a behavioral model, the model may be applied to model either non-malicious (i.e., good) behavior or malicious behavior. In one aspect, the non-malicious and malicious behaviors may be provided to the archive analyzer 203 by the management system 115.

In one aspect, the machine learning module 114 is used to build a set of rules by: collecting a large amount of data from the centralized storage 110, classifying the collected data, building the set of rules, and periodically adjusting the built set of rules based on new data (including behavior, malicious software, etc.). It is noted that the machine learning module 114 may be used to learn behavioral patterns of malicious programs. Equivalently, the machine learning module 114 may be used to learn behavioral patterns of trusted programs.

In one aspect, the analysis of the detected changes is performed using a white list established for a list of changes made by trusted programs and/or for a list of trusted programs. Typically, the types of changes made by trusted programs are different from changes that are made by malware.

In one aspect, the analysis of the detected changes is performed using a black list established for a list of changes made by malicious programs and/or for a list of malicious programs.

In one aspect, the analysis is performed to identify changes in a structure of a file system of the computing device. In one aspect, the changes in the structure of the file system comprise at least one of: an emergence of any number of new files, and an emergence of new directories. The new files or the new directories are "new" in relation to a previous backup. For instance, backup slices $103_{n,1}$ and $103_{n,2}$ may be compared. As shown in FIG. 2, backup slice $103_{n,2}$ is newer than backup slice $103_{n,1}$. Therefore, if new directories or files are found in backup slice $103_{n,2}$ when compared against backup slice $103_{n,1}$, the archive analyzer 203 identifies the change in the structure.

In one aspect, the analysis is performed to identify changes in attributes of files and/or directories. For example, changes in metadata associated with files, filename extensions, file system permissions, memory allocations, etc., may be made.

In one aspect, the analysis is performed to identify changes in hierarchical database that is used to store operating system settings, e.g., Windows Registry (registry for storing settings for Microsoft Windows operating system).

In one aspect, the analysis is performed to identify changes to access rights. For example, access rights to some objects, e.g., files, directories, etc., may be altered between backup slices. In one aspect, the change to access rights is detected when a content of an access control list for a file system of a computing device is modified.

In one aspect, the analysis is performed to identify changes in various categories. For example, the analysis may simultaneously identify changes in any combination of: a structure of the file system of the computing device, attributes of files and directories, changes to hierarchical databases used to store operating system settings, and access rights to objects of the file system.

Returning to the various models used to analyze the detected changes, in one aspect, when the analysis of the detected changes is based on a heuristic model, the model may be applied by: establishing respective weights on a decision-making scale based on types and quantities of changes, establishing thresholds for taking remediation actions, taking at least one remediation action when a threshold is reached or exceeded.

In one aspect, the threshold for taking an remediation action is based on a combination of changes and respective significances. For example, if changes to access rights and also to the structure of the file system are detected, the combination of changes may signify a greater threat. Thus, the remediation action that follows may be different compared to a remediation action that would be taken if only one of the two changes was detected. For example, the remediation action may be to reverse the changes that have been made between the current and a previous backup slice. In another example, the action may be updating detection rules so that other backup archives for other computing devices are not affected by the same malicious program. In another example, the remediation action may be changing access control rules for some computing devices that may have vulnerabilities.

In one aspect, the data obtained for one backup archive may be distributed to other backup archives in the centralized storage device 110. For example, data obtained for backup archive $102_n$ may be sent to all of the other backup archives $102_a$, $102_b$, . . . , $102_m$.

The centralized storage 110 advantageously enables the anti-virus scanner 202 to avoid scanning the same data multiple times. Moreover, deduplication of data may be performed on the centralized storage 110 to further reduce chances of scanning the same data multiple times. For example, the deduplication may be performed by computing hashes of a plurality of blocks of data, comparing to determine whether the blocks based on the comparison of their hashes, and storing only one copy of the blocks that are found as being similar.

Figure 3:
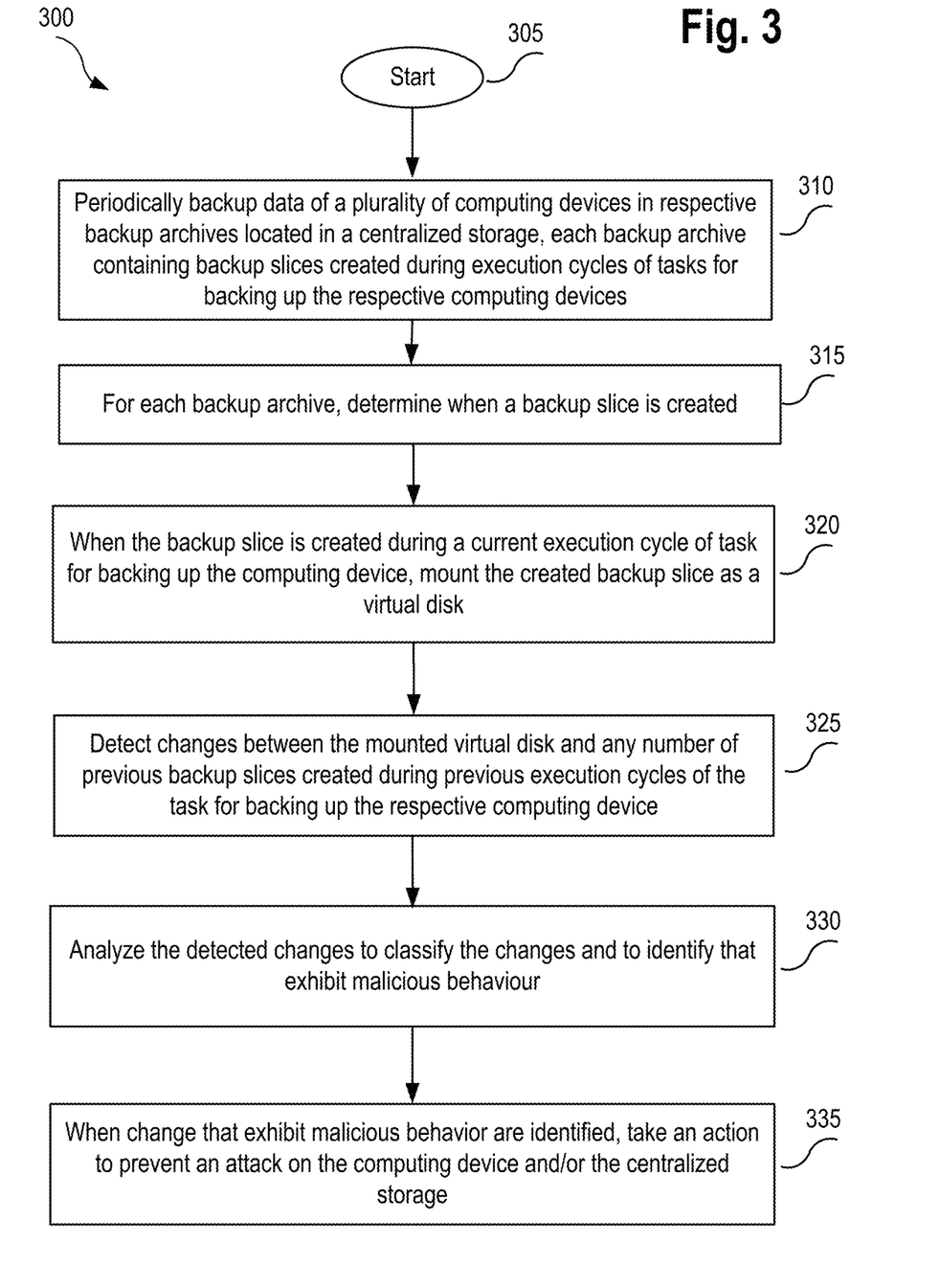
FIG. 3 illustrates a flow diagram of a method for anti-virus scanning of backup data in accordance with aspects of the present disclosure.

FIG. 3 illustrates a flow diagram of a method 300 for anti-virus scanning of backup data in accordance with aspects of the present disclosure. Method 300 starts in step 305 and proceeds to step 310.

In step 310, method 300 periodically backs up data of a plurality of computing devices in respective backup archives located in a centralized storage, wherein each backup archive contains any number of backup slices, and wherein each backup slice is created during an execution cycle of a task for backing up the respective computing device.

In step 315, method 300, for each backup archive, determines when a backup slice is created for backing up a respective computing device.

In step 320, when the backup slice is created during a current execution cycle of a task for backing up the computing device, method 300 mounts the created backup slice as a virtual disk.

In step 325, method 300 detects changes between the mounted virtual disk and any number of previous backup slices created during previous execution cycles of the task for backing up the respective computing device.

In step 330, method 300 analyzes the detected changes to classify the changes and to identify changes that exhibit malicious behavior.

In step 335, when changes that exhibit malicious behavior are identified, method 300 takes a remediation action to prevent an attack on the computing device and/or the centralized storage.

In one aspect, the analysis of the detected changes is based on: a statistical model, a heuristic model, a behavioral model, or any other model.

In one aspect, when the analysis of the detected changes is based on a heuristic model, the model is applied by: establishing respective weights on a decision-making scale based on types and quantities of changes, establishing thresholds for taking actions, and taking at least one action when a threshold is reached or exceeded.

In one aspect, the analysis of the detected changes is performed using a black list established for a list of changes made by malicious programs or for a list of malicious programs.

In one aspect, the analysis is performed to identify changes in a structure of a file system of the computing device, the changes in the structure of the file system comprising at least one of: an emergence of any number of new files, and an emergence of new directories.

In one aspect, the analysis is performed to identify changes in a hierarchical database used to store settings of an operating system of the computing device.

In one aspect, the analysis is performed to identify changes to access rights.

The anti-virus scanning method and system of the present disclosure, as described above, has several advantaged. First, the system of the present disclosure performs the scanning in a predictive manner, i.e., before an attack is launched. Therefore, actions can be taken to prevent similar malicious activities on other computing devices. Moreover, when a malicious program is discovered before it causes damage, all of the other computing devices that use the same centralized storage can benefit.

Unlike a conventional anti-virus scanner that may be installed on each of the plurality of computing devices and may individually scan for malicious objects on the respective computing device, system 100 is better equipped to identify malicious behavior based on activity on multiple computing devices. These changes may be novel in nature because their signatures and definitions may not exist in virus databases.

Figure 4:
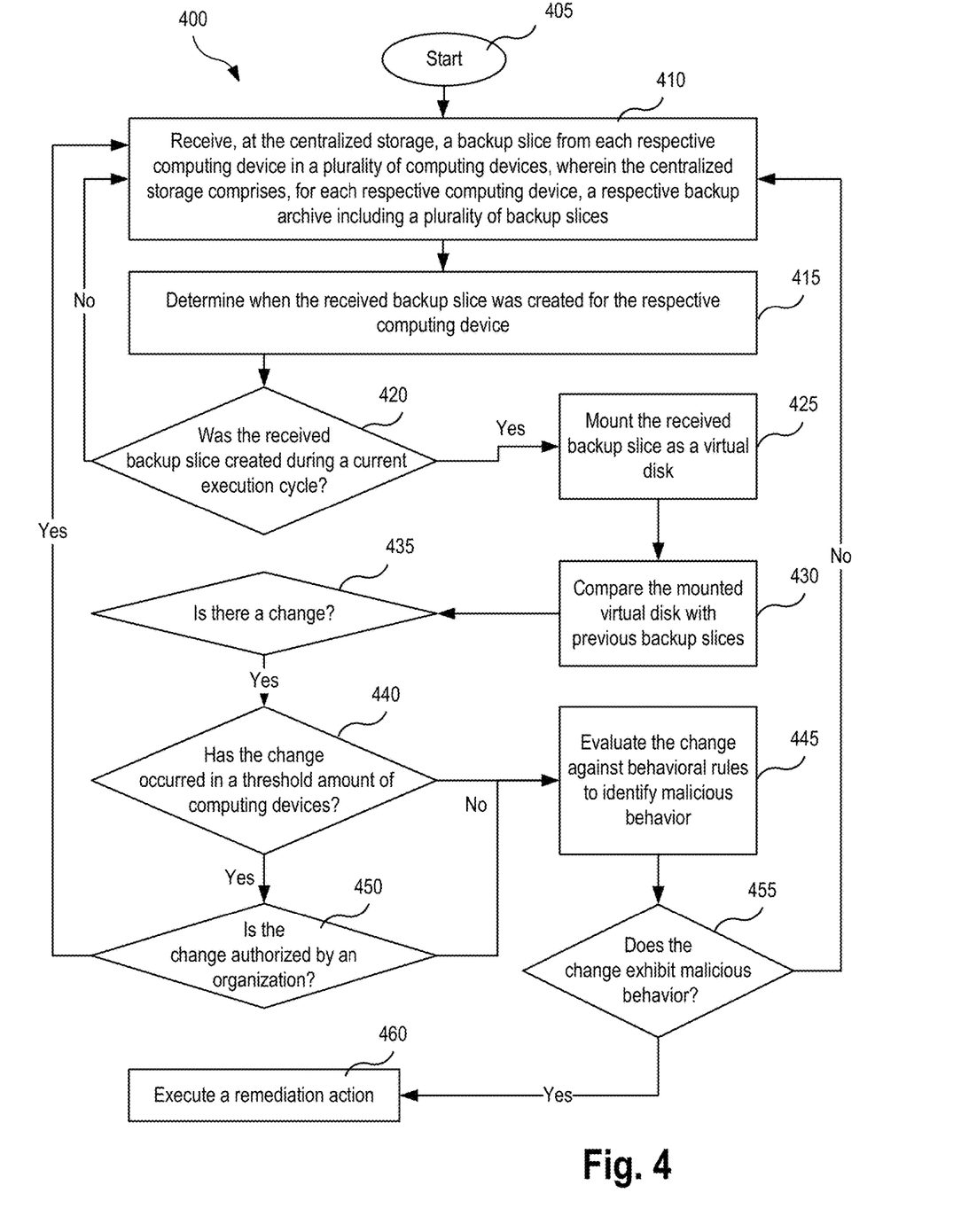
FIG. 4 illustrates a flow diagram of a method for detecting malicious behavior based on changes across computing devices in a network in accordance with aspects of the present disclosure.

FIG. 4 illustrates a flow diagram of method 400 for detecting malicious behavior based on changes across computing devices in a network in accordance with aspects of the present disclosure. Method 400 starts in step 405 and proceeds to step 410.

In step 410, management system 115 receives, at the centralized storage, a backup slice from each respective computing device in a plurality of computing devices (e.g., 101a-n), wherein the centralized storage comprises, for each respective computing device, a respective backup archive (e.g., 102a-n) including a plurality of backup slices (e.g., 103). In some aspects, the plurality of computing devices are all connected to a network of an organization.

In step 415, management system 115 determines when the received backup slice was created for the respective computing device. In an exemplary aspect, backup slices are received in accordance to a periodic execution cycle (e.g., a new backup slice may be received every 1 hour). Management system 115 tracks the cycles across each of the computing devices. For example, a first backup slice may be received from computing device 101a at 9:01 pm, a second backup slice may be received from computing device 101b at 9:10 pm, and a third backup slice may be received from computing device 9:09 pm. Despite the differing timestamps, management system 115 may determine that the current execution cycle is between 9:00 pm and 9:15 pm. The period of an execution cycle in this case may be 15 minutes. This means that the next execution cycle will be from 9:15 pm to 9:30pm and the previous execution cycle was from 8:45 pm to 9:00 pm.

In step 420, management system 115 determines whether the backup slice was created during a current execution cycle. For example, management system 115 determines whether the backup slice was created within 9:00 pm and 9:15 pm. In response to determining that it was, method 400 advances to 425, where archive mounter 201 mounts the received backup slice as a virtual disk. At 430, archive analyzer 203 compares the mounted virtual disk with previous backup slices. At 435, archive analyzer 203 determines whether there is a change between the received backup slice the and previous backup slices. A change may involve detecting at least one of: a new file in a directory, a new directory, a change in size of an existing file, a change in location of the existing file, deletion of the existing file, and a change in metadata of the existing file.

If no change is detected, method 400 returns to 410, where management system 115 receives the next backup slice. However, if a change is detected, method 400 advances to 440. At 4410, management system 115 determines whether the change has occurred in a threshold amount of the plurality of computing devices. For example, suppose that there are a total of 5 devices in the plurality of computing devices and all of them are connected under the same network (e.g., their company Wi-Fi). In such a scenario, changes across the plurality of computing devices are generally uniform and consistent (i.e., an administrator releases the same updates to all of the plurality of computing devices around the same time). If archive analyzer 203 detects a new version of an operating system on a computing device of the plurality of computing devices, for example, archive analyzer 203 may determine whether the remaining computing devices in the plurality of computing devices have also experienced this update in their operating system during the current execution cycle (or within X number of execution cycles). Because certain users may stall on updating their operating systems or, due to hardware/network differences are unable to make updates within the current execution cycle, unanimous change may not be detected. Accordingly, archive analyzer 203 may determine whether at least a threshold amount (e.g., half, 75%, 4 of 5, etc.) of the plurality of computing devices have experienced the change.

In response to determining that the change has occurred in the threshold amount of computing devices, method 400 advances to 450, where archive analyzer 203 determines whether the change was authorized by the organization. For example, archive analyzer 203 may identify an administrator or IT professional of the organization associated with the plurality of computing devices and request confirmation that the change was authorized. In response to determining that the change was authorized, method 400 returns to 410. In some aspects, in response to determining that the change was authorized by the organization, management system 115 may add, to the behavior rules, a new rule that whitelists the change.

However, if the change was not authorized by the organization or if the change did not occur in a threshold amount of computing devices, method 400 advances to 445, where archive analyzer 203 evaluates the change against behavioral rules to identify malicious behavior. In this case, the change may be anomaly. For example, a user of the computing device may have installed an application on the computing device that was not part of approved or pre-installed applications provided by the organization. To determine whether the change exhibits malicious behavior, archive analyzer 203 may refer to behavior rules that indicate whether the change is safe. The behavior rules may be structured as if/else statements. Archive analyzer 203 may query when the change was made, by whom, the processes/threads associated with the change, the degree to which the change occurred, etc. For example, behavioral rules may include "if the change occurred between 2:00 am and 3:00 am, the change exhibits malicious behavior," "if the change involves a download from a website not in the whitelist, the change exhibits malicious behavior," "if the change takes more than X percent of CPU usage, the change exhibits malicious behavior." These example behavior rules are simplistic and are meant to provide an idea of what a rule may look like. One skilled in the art will appreciate that several thousand behavior rules may exist depending on the type of change. These behavioral rules may feature a combination of criteria (e.g., if the change involves a file download from [predetermined IP address] and occurred between [predefined time window] and the file was not directly accessed by a user for [predetermined amount of time], the change exhibits malicious behavior).

Furthermore, certain rules may indicate that a change is in a whitelist of authorized changes. Thus, if those changes are detected that are in the whitelist, archive analyzer 203 does not need to perform a remediation action. In contrast, certain rules may indicate that a change is in a blacklist and therefore remediation actions are necessary. In some aspects, archive analyzer 203 may identify an object that was changed (e.g., added, deleted, or modified). The blacklist and whitelist may be specific to that object. For example, the blacklist may indicate all the changes that are prohibited for that object and the whitelist may indicate all changes that are approved. Suppose that the object is a DLL file that should not be deleted. If archive analyzer 203 determines that the DLL file has been deleted and should not be (according to the blacklist), the change is identified as exhibiting malicious behavior.

At step 455, archive analyzer 203 determines whether the change exhibits malicious behavior based on the behavioral rules. For example, suppose that the change involves the detection of a new PDF file in the latest backup slice. This change may only be detected in less than a threshold amount of the plurality of computing devices. Accordingly, archive analyzer 203 may not contact the administrator. One of the reasons method 400 proceeds to 450 only in response to determining that a threshold amount of the plurality of computing devices have experienced the change is because certain changes may be specific to a single device and can be private to a user. For example, the new PDF may potentially contain private information about an employee in the organization, wherein the employee is a user of the computing device. Because the information is private, informing the organization may be undesirable—especially if the change is not malicious at all. Furthermore, a balance needs to be struck in knowing when to elevate a change to an organization-wide issue. Because changes may be abundant and files are added, deleted, modified all the time, elevating each change to the administrator is inefficient.

Nonetheless, at step 445, archive analyzer 203 may evaluate the creation of the new PDF against behavioral rules. In some aspects, the behavioral rules are specific to each computing device. In some aspects, the behavioral rules are specific to each user, wherein each backup slice is tagged with an identifier of the user that last used the computing device before the backup slice was generated (i.e., the user that was using the computing device when the change occurred). It should be noted that PDF files may appear harmless at face value, but can potentially be sources of malicious attacks. For example, a malicious entity such as a hacker may inject scripts into the PDF file or may add embedded and encrypted objects (which prevent analysis using a conventional antivirus scanner). To identify the creation of the PDF file as exhibiting malicious behavior, archive analyzer 203 may evaluate the PDF files against rules such as "if the file has a size greater than [X mb], was downloaded from [predetermined IP address], and was not directly accessed by a user for [predetermined amount of time], the change exhibits malicious behavior."

In response to detecting the malicious behavior, method 400 advances to 460, where management system 115 performs a remediation action. A remediation action may include, but is not limited to, (1) alerting an administrator of the organization that the change was detected, (2) alerting the user of the computing device that the change was detected, (3) restoring the computing device using the most recent backup slice that does not include the change, (4) running antivirus scanner 202 on the backup slice and in response to determining that the change is associated with a virus, sending an alert to the user of the computing device with instructions to quarantine/remove at least one file detected by the antivirus scanner 202 as a virus or generating a script that automatically removes or quarantines the at least one file, (5) generating a new behavioral rule that specifies that if that particular change is detected in any computing device, it is associated with malicious behavior and needs a remediation action.

As discussed previously, the centralized storage may also store the backup archives of the additional computing devices that are not part of the plurality of computing devices discussed throughout method 400. These additional computing devices may be part of a different network. Accordingly, subsequent to determining that the change exhibits malicious behavior, management system 115 may also execute the remediation action to prevent the attack on the additional computing devices. For example, management system 115 may alert the anti-virus scanners located in each of the additional computing devices, of the change. This will allow the anti-virus scanners to scan for and prevent the attack associated with the change before its effects even make it into a backup slice.

As mentioned before, certain computing devices will be more prone to an attack than other computing devices. For example, in the plurality of computing devices, one device may store highly sensitive information about an organization's finances while the others may not. That particular device may further belong to an administrator of the organization that distributes updates to the other computing devices. In some cases, the device may be more prone to being comprised by a malicious entity because the device has not been updated (while the other devices in the organization have) with security patches. In some cases the hardware capabilities of the device may be less reliable than the other devices in the organization. For example, the device may have an older network adapter that causes for slower network speeds.

In view of this, in some aspects, management system 115 may determine, for each respective computing device, a respective likelihood of the respective computing device to be targeted by a malicious attack. The likelihood may be relative to the other computing devices in a particular organization. For example, if there are five computing devices in the plurality of computing devices, management system 115 may identify the devices that are used by users of higher rank in the organization (e.g., CEO, President, etc.) and assign them a rank based on the number of devices (e.g., 1 to 5). Here a higher rank represents a higher likelihood of being attacked. Management system 115 may then assess other features such as ranking devices based on an amount of utilized storage, network speeds, age of the system, hardware capabilities, CPU utilization, etc. Upon assessing each of the features, management system 115 may have several ranks values. In some aspects, the likelihood is a sum of all of these ranks. For example, if a particular computing device has ranks 3, 5, 2, 1, 1, and 2, the likelihood is 14. In some aspects, management system 115 may normalize each of the likelihoods. For example, if the likelihoods of the five computing devices are 10, 12, 9, 18, and 13, the normalized likelihood values (i.e., dividing by the sum of 62) may be 0.16, 0.19, 0.14, 0.29, and 0.21.

Management system 115 may then identify, as part of a subset of computing devices, each respective computing device with a respective likelihood greater than a threshold likelihood. For example, threshold likelihood may be 0.20. Accordingly, the last two computing devices in the list above would be considered as part of the subset of computing devices. These devices are determined to be the most prone in the organization. Therefore, if a change is detected in these particular devices and none of the other devices, archive scanner 202 may identify this is as targeted malicious attack. More specifically, archive scanner 202 may determine whether the change is detected in more than a threshold amount of the subset of computing devices, in response to determining that the change is detected in more than the threshold amount of the subset, the archive scanner 202 may determine that the change exhibits malicious behavior.

Figure 5:
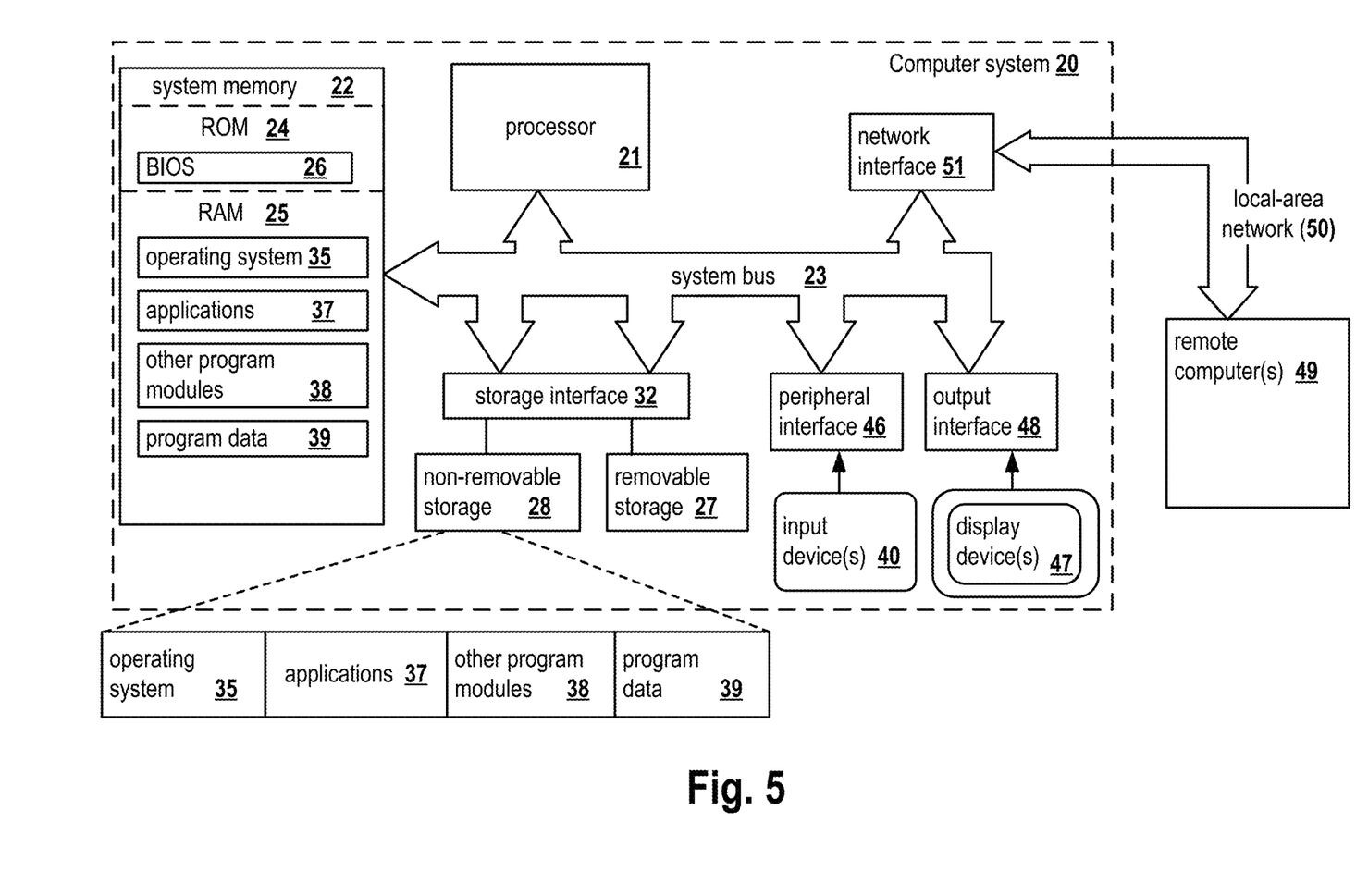
FIG. 5 presents an example of a general-purpose computer system on which aspects of the present disclosure can be implemented.

FIG. 5 is a block diagram illustrating a computer system 20 on which aspects of systems and methods for anti-virus scanning of backup data at a centralized storage may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for anti-virus scanning of backup data at a centralized storage, the method comprising:
   receiving, at the centralized storage, a backup slice from each respective computing device in a plurality of computing devices, wherein the centralized storage comprises, for each respective computing device, a respective backup archive including a plurality of backup slices;
   determining when the received backup slice is created for backing up the respective computing device, wherein backup slices are received in accordance to an execution cycle that is periodic;
   in response to determining that the received backup slice is created during a current execution cycle, mounting the received backup slice as a virtual disk;
   detecting, for the respective computing device, a change between the mounted virtual disk and any number of previous backup slices, in the respective backup archive, created during previous execution cycles;
   determining whether the change has occurred in at least a threshold amount of remaining computing devices in the plurality of computing devices backing up to the centralized storage;
   in response to determining that the change has not occurred in at least the threshold amount of the remaining computing devices, evaluating the change against behavioral rules to identify malicious behavior; and
   in response to determining that the change exhibits malicious behavior, executing a remediation action to prevent an attack on the plurality of computing devices or the centralized storage.

2. The method of claim 1, wherein the plurality of computing devices are all connected to a network of an organization.

3. The method of claim 2, further comprising:
   in response to determining that the change has occurred in at least the threshold amount of the remaining computing devices, determining whether the change has been authorized by the organization; and
   in response to determining that the change has been authorized by the organization, adding to the behavior rules a rule that whitelists the change.

4. The method of claim 3, further comprising in response to determining that the changed not been authorized by the organization, determining that the change exhibits malicious behavior.

5. The method of claim 2, further comprising:
   determining, for each respective computing device, a respective likelihood of the respective computing device to be targeted by a malicious attack;
   identifying, as part of a subset of computing devices, each respective computing device with a respective likelihood greater than a threshold likelihood.

6. The method of claim 5, further comprising:
   determining whether the change is detected in more than a threshold amount of the subset of computing devices; and
   in response to determining that the change is detected in more than the threshold amount of the subset, determining that the change exhibits malicious behavior.

7. The method of claim 2, wherein the centralized storage comprises an additional plurality of backup archives of an additional plurality of computing devices that are connected to a different network of a different organization.

8. The method of claim 7, further comprising subsequent to determining that the change exhibits malicious behavior, executing the remediation action to prevent the attack on the additional plurality of computing devices.

9. The method of claim 1, wherein evaluating the change against the behavioral rules to identify malicious behavior comprises:
   identifying an object in the received backup slice that was changed;
   determining whether the change is in a whitelist of approved changes to the object; and
   in response to determining that the change is not in the whitelist, determining that the change exhibits malicious behavior.

10. The method of claim 1, wherein evaluating the change against the behavioral rules to identify malicious behavior comprises:
    identifying an object in the received backup slice that was changed;
    determining whether the change is in a blacklist of changes prohibited for the object; and
    in response to determining that the change is in the blacklist, determining that the change exhibits malicious behavior.

11. The method of claim 1, wherein the behavioral rules are based on a heuristic model that is applied by:
    establishing respective weights on a decision-making scale based on types and quantities of changes;
    establishing thresholds for taking remediation actions; and
    taking at least one remediation action when a threshold is reached or exceeded.

12. The method of claim 1, wherein detecting the change comprises detecting at least one of: a new file in a directory, a new directory, a change in size of an existing file, a change in location of the existing file, deletion of the existing file, and a change in metadata of the existing file.

13. A system for anti-virus scanning of backup data at a centralized storage, the system comprising:
    a hardware processor configured to:
    receive, at the centralized storage, a backup slice from each respective computing device in a plurality of computing devices, wherein the centralized storage comprises, for each respective computing device, a respective backup archive including a plurality of backup slices;

determine when the received backup slice is created for backing up the respective computing device, wherein backup slices are received in accordance to an execution cycle that is periodic;

in response to determining that the received backup slice is created during a current execution cycle, mount the received backup slice as a virtual disk;

detect, for the respective computing device, a change between the mounted virtual disk and any number of previous backup slices, in the respective backup archive, created during previous execution cycles;

determine whether the change has occurred in at least a threshold amount of remaining computing devices in the plurality of computing devices backing up to the centralized storage;

in response to determining that the change has not occurred in at least the threshold amount of the remaining computing devices, evaluate the change against behavioral rules to identify malicious behavior; and in response to determining that the change exhibits malicious behavior, execute a remediation action to prevent an attack on the plurality of computing devices or the centralized storage.

14. The system of claim 13, wherein the plurality of computing devices are all connected to a network of an organization.

15. The system of claim 14, wherein the hardware processor is further configured to:

in response to determining that the change has occurred in at least the threshold amount of the remaining computing devices, determine whether the change has been authorized by the organization; and in response to determining that the change has been authorized by the organization, add to the behavior rules a rule that whitelists the change.

16. The system of claim 15, wherein the hardware processor is further configured to in response to determining that the changed not been authorized by the organization, determine that the change exhibits malicious behavior.

17. The system of claim 14, wherein the hardware processor is further configured to:

determine, for each respective computing device, a respective likelihood of the respective computing device to be targeted by a malicious attack;

identify, as part of a subset of computing devices, each respective computing device with a respective likelihood greater than a threshold likelihood.

18. The system of claim 17, wherein the hardware processor is further configured to:

determine whether the change is detected in more than a threshold amount of the subset of computing devices; and in response to determining that the change is detected in more than the threshold amount of the subset, determine that the change exhibits malicious behavior.

19. The system of claim 14, wherein the centralized storage comprises an additional plurality of backup archives of an additional plurality of computing devices that are connected to a different network of a different organization.

20. A non-transitory computer readable medium storing thereon computer executable instructions for anti-virus scanning of backup data at a centralized storage, including instructions for:

receiving, at the centralized storage, a backup slice from each respective computing device in a plurality of computing devices, wherein the centralized storage comprises, for each respective computing device, a respective backup archive including a plurality of backup slices;

determining when the received backup slice is created for backing up the respective computing device, wherein backup slices are received in accordance to an execution cycle that is periodic;

in response to determining that the received backup slice is created during a current execution cycle, mounting the received backup slice as a virtual disk;

detecting, for the respective computing device, a change between the mounted virtual disk and any number of previous backup slices, in the respective backup archive, created during previous execution cycles;

determining whether the change has occurred in at least a threshold amount of remaining computing devices in the plurality of computing devices backing up to the centralized storage;

in response to determining that the change has not occurred in at least the threshold amount of the remaining computing devices, evaluating the change against behavioral rules to identify malicious behavior; and in response to determining that the change exhibits malicious behavior, executing a remediation action to prevent an attack on the plurality of computing devices or the centralized storage.

* * * * *